April 28, 1942.   F. R. CAMPANA ET AL   2,281,231
RETAINING CLIP FOR WEDDING AND ENGAGEMENT RINGS
Filed March 20, 1941
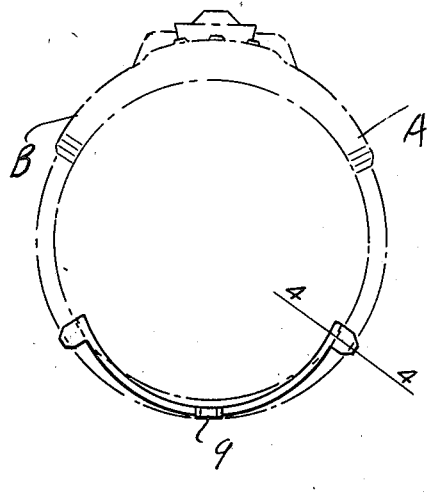
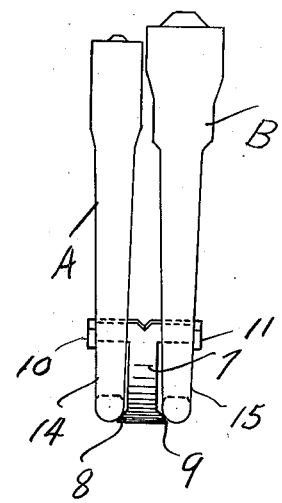
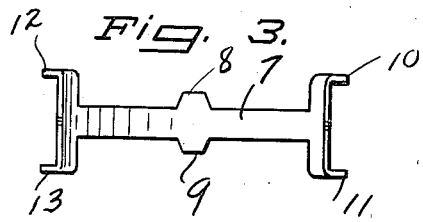
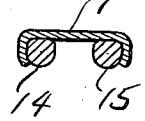
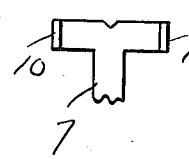
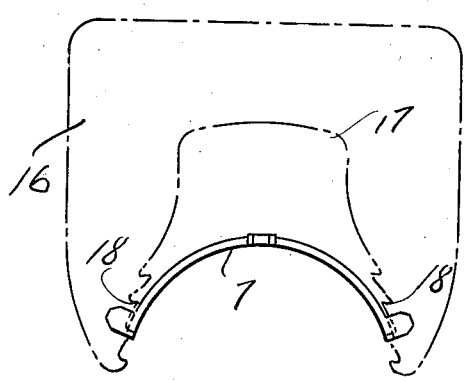
INVENTORS.
FRANK R CAMPANA
WILLIAM GOETZ
BY
ATTORNEY.

Patented Apr. 28, 1942

2,281,231

UNITED STATES PATENT OFFICE 2,281,231

RETAINING CLIP FOR WEDDING AND ENGAGEMENT RINGS

Frank R. Campana and William Goetz, San Francisco, Calif.

Application March 20, 1941, Serial No. 384,290

4 Claims. (Cl. 63—15)

This invention relates to an improved clip for retaining a wedding ring and an engagement ring in locked position upon a finger to eliminate the possibility of one ring turning on the finger relative to the other ring, which condition often occurs when loose rings are worn.

The primary object of the invention is the provision of a unique and simplified locking means for retaining a wedding ring and an engagement ring in locked position to prevent the turning of the rings relative to each other, and to provide a retaining clip that may be easily removed from the rings for cleaning purposes, and a retaining means that will properly space the rings from each other when the same are placed upon the finger of the wearer.

An additional object of the invention is to provide a clip of the character described capable of retaining a wedding ring and an engagement ring in locked relation, which clip conforms to the configuration of the rings on the finger.

A further object of the invention is to provide a locking means of the character described that is positioned on the rings at a point diametrically opposite to the ring settings, which locking means will, accordingly, be hidden from view.

A further object of the invention is to provide a ring retaining clip that is economical to manufacture, exceedingly simple in construction, one that may be readily applied to the rings, and one that will effectively and positively hold the rings in a fixed position.

Other objects and advantages will be apparent during the course of the following description.

In the accompanying drawing forming a part of this specification and in which like numerals are employed to designate like parts throughout the same, Fig. 1 is a side view, showing the clip in retaining position upon the rings, with the rings being shown in dotted lines and the retaining clip in full lines;

Fig. 2 is an end elevation of the rings illustrated in full lines, with the retaining clip positioned therebetween and illustrating to advantage the manner in which the rings are spaced apart;

Fig. 3 is a plan view of the clip per se;

Fig. 4 is a transverse section through the clip and the spaced rings, the view being taken on the line 4—4 of Fig. 1 and looking in the direction of the arrows;

Fig. 5 is a fragmentary detailed view of a portion of the clip; and

Fig. 6 illustrates a retaining member for the clips that serves to retain the clips when the same are positioned on the rings.

It is a well-known fact that unless some type of retaining clip is employed to lock the engagement and wedding rings in a fixed position, the rings will turn on the finger and thus cause wear on both rings on the contacting edges, which will result in a weakening of the mounting and a consequent loosening of the precious stones that often become lost from said mounting.

We have, accordingly, endeavored in the present invention to provide a very simple and inexpensive clip that not only conforms to the contour of the ring bands but also spaces the rings apart and holds them in positive locked relation to thus prevent a turning of the rings relative to each other.

In the accompanying drawing wherein for the purpose of illustration is shown a preferred embodiment of our invention, the improved clip, designated as a whole by the numeral 7, consists of a light, spring-like material and embodies in its construction an arcuate segmental section that is positioned between the wedding ring A and the engagement ring B and at a point diametrically opposite to the setting of the respective rings. This segment tends to space the rings apart. The retaining clip has centrally provided thereon oppositely disposed and integrally formed tapered tangs 8 and 9 that engage the outer surfaces of the ring bands, while there are likewise provided end tangs 10, 11, 12, and 13, which tangs are capable of engaging the inner surfaces of the ring bands.

In placing the device in position upon the bands of the rings, indicated by the numerals 14 and 15, the said tangs 10, 11, 12, and 13 are sprung over the inside of the bands of the rings, while the central tangs 8 and 9 are sprung into position under the outside of the ring bands, as disclosed to advantage in Fig. 2. Accordingly, the segmental clip rests between and spaces the bands of the rings so that the objects of the invention may be readily accomplished.

By the provision of this improved simplified clip, we effect a positive and frictional locking of the wedding ring A with relation to the engagement ring B, and, accordingly, neither of the rings can move about the finger relative to each other.

In Fig. 6 we have illustrated a retaining member for the clips, which retaining member is indicated by the numeral 16, having a central opening 17 therein and oppositely disposed teeth 18, certain of which teeth receive the end tangs of the clip. This particular device presents a means for retaining said clips when the same are positioned on the rings.

It is to be understood that the form of our invention herewith shown and described is to be taken as a preferred example of the same and that various changes relative to the material, size, shape and arrangement of parts may be resorted to without departing from hte spirit of the invention or the scope of the subjoined claims.

Having thus described our invention, we claim:

1. A device for retaining a wedding ring and an engagement ring together, comprising a curved member having resilient means engaging the inner peripheries of the rings and another means engaging the outer peripheries of the rings, whereby the two rings are retained in a resiliently locked position together.

2. A device for retaining a wedding ring and an engagement ring together, comprising a curved elongated spring member extending between the wides of the rings for keeping the rings in spaced relation, said curved spring member having a plurality of tangs engaging the inner peripheries of the rings and a plurality of other tangs engaging the outer peripheries of the rings whereby the two rings are held in a locked position together.

3. A device for retaining a wedding ring and an engagement ring together, comprising a spring member of segmental form extending between the rings for keeping the rings in spaced relation, said spring member having end tangs extending across the inner peripheries of the rings and engaging the outer sides thereof and central tangs engaging the lower outer peripheries of the rings whereby the two rings are held in a locked position together.

4. A device for retaining a wedding ring and an engagement ring together, comprising an elongated spring member in segmental form extending between the rings for keeping the rings apart, said spring member having oppositely disposed laterally tapered central tangs engaging the lower outer peripheries of the rings and end tangs engaging the inner peripheries and outer sides of the rings above said tapered central tangs, the outer periphery of the spring member extending from the outer peripheries of the rings to the inner peripheries thereof whereby the tangs retain the two rings in a resiliently locked position together.

FRANK R. CAMPANA.
WILLIAM GOETZ.